March 24, 1970     T. L. BUTTERFIELD     3,502,221
FILTER UNIT FOR SPRAYERS
Filed May 14, 1968     2 Sheets-Sheet 1
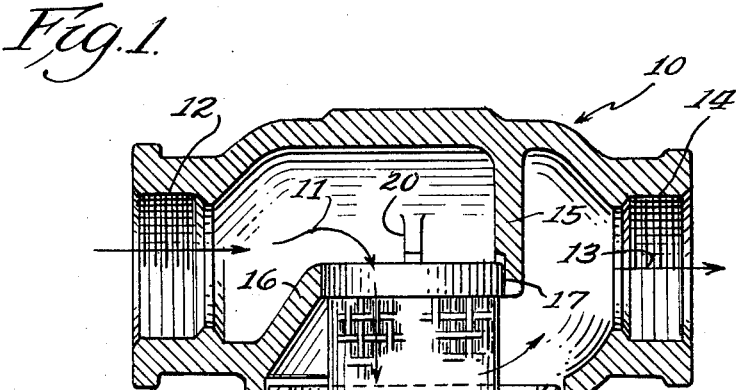
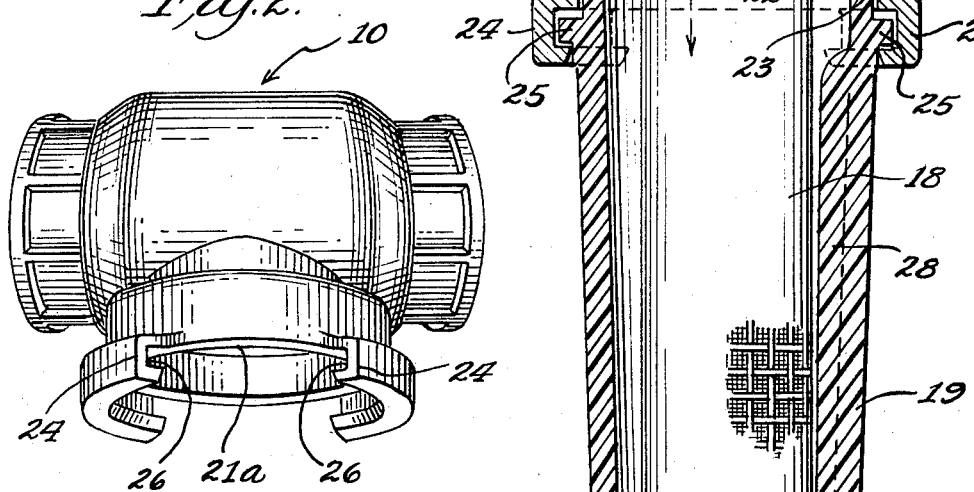
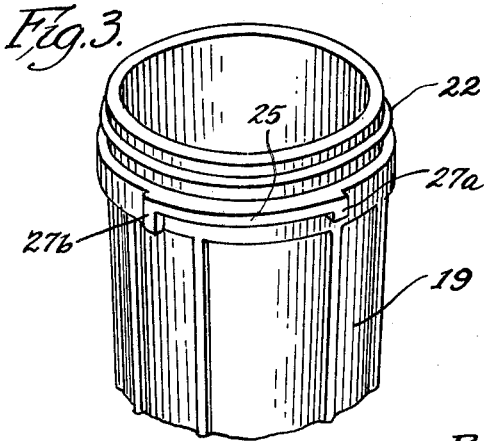
Inventor
Ted Lee Butterfield
By Mann, Brown & McWilliams
Attys March 24, 1970     T. L. BUTTERFIELD     3,502,221
FILTER UNIT FOR SPRAYERS
Filed May 14, 1968     2 Sheets-Sheet 2
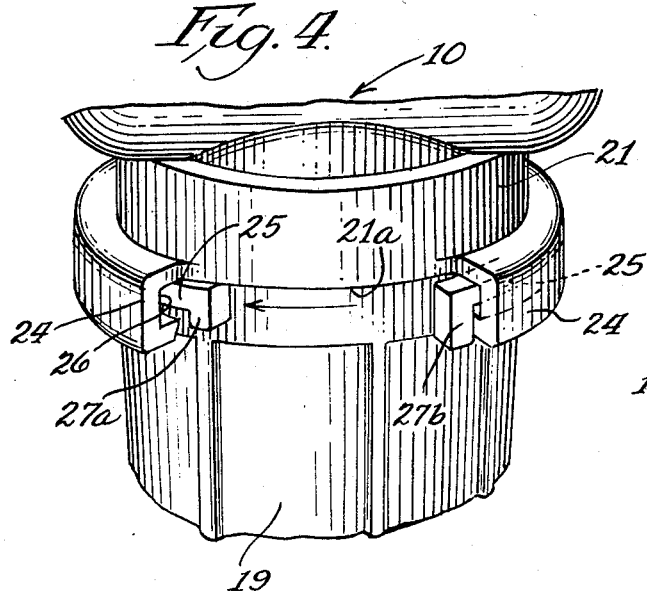
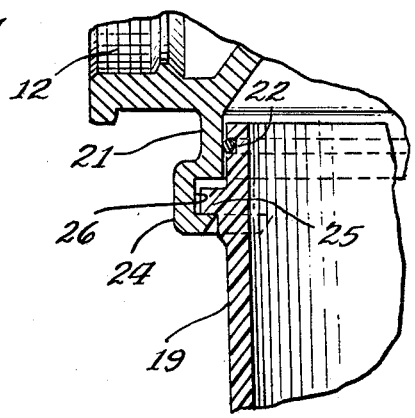
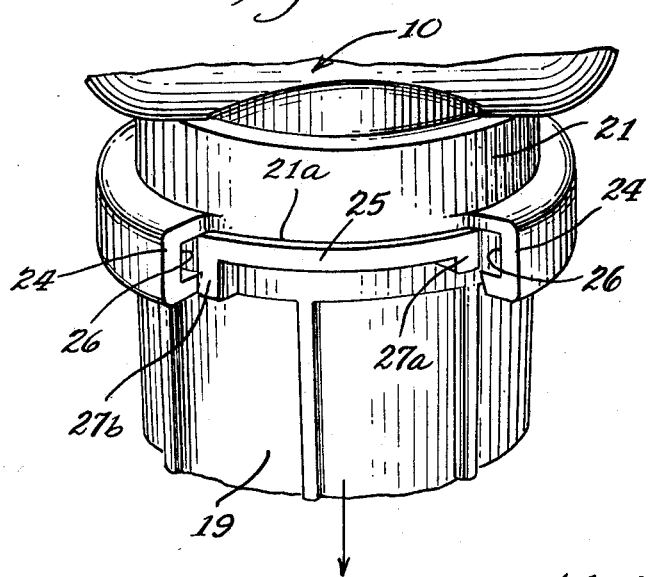
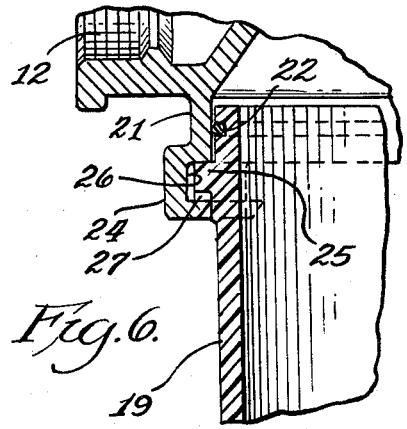
Inventor
Ted Lee Butterfield
By Mann, Brown & McWilliams
Attys.

United States Patent Office 3,502,221
Patented Mar. 24, 1970

3,502,221
FILTER UNIT FOR SPRAYERS
Ted Lee Butterfield, Naperville, Ill., assignor to Spraying Systems Co., a corporation of Illinois
Filed May 14, 1968, Ser. No. 729,002
Int. Cl. B01d *27/08*
U.S. Cl. 210—444                                                          6 Claims

ABSTRACT OF THE DISCLOSURE

A strainer for fluid systems having a quick detachable screen housing for the strainer screen. The housing is held in position by a special lug and groove arrangement which permits expansion of the cover when the strainer is pressurized to thus lock the housing and strainer screen in position.

---

The present application is directed to new and useful improvements in strainer assemblies for fluid pressure lines.

Strainer assemblies have been widely used in fluid lines and in many agricultural and industrial installations are formed with a housing which holds the strainer screen in position and which allows periodic removal of the strainer screen for purposes of cleaning or replacement. Prior strainer constructions of this general type have oftentimes included screw threaded connections between the housing and the fluid body to which it is connected. This requires considerable manipulation and oftentimes requires tools in order to remove the housing. Also, in prior strainer constructions the strainers have been so formed that vibrations or the like may cause eventual loosening of the housing with the result that the housing may become disassembled from the fluid coupling element to which it is attached. With the foregoing in mind, the major purposes of the present invention are to so form a strainer housing and fluid coupling that the housing may be quickly attached to and detached from the fluid coupling element with a minimum of effort, to so form such an assembly that the strainer cover may be easily detached from and attached to the fluid coupling element with a single hand, to so form strainer assemblies of this class that the housing is automatically locked on the fluid coupling element in response to a pressurized condition within the strainer assembly, and to provide simple and effective sealing means for the housing and fluid coupling body thus formed, these and other purposes being more apparent in the course of the ensuing specification and claims, when taken with the accompanying drawings, in which:

FIGURE 1 is a sectional view of a typical strainer body incorporating the principles of the present invention;

FIGURE 2 is a perspective view of the fluid coupling element illustrated in FIGURE 1;

FIGURE 3 is a perspective view of the housing illustrated in FIGURE 1;

FIGURE 4 is a perspective view of a portion of the assembled fluid coupling body and screen housing illustrated in FIGURE 1;

FIGURE 5 is a sectional view of the coupling elements of the housing and fluid coupling element element illustrated in FIGURE 1 under one condition of operation;

FIGURE 6 is a sectional view of the same elements illustrated in FIGURE 5 while illustrating another position of the strainer cover and fluid coupling element; and FIGURE 7 is a perspective view of a portion of the housing and coupling element and illustrating relative positions of the housing and coupling prior to coupling or after uncoupling thereof.

Like elements are designated by like characters throughout the specification and drawings.

With specific reference now to the drawings and in the first instance to FIGURE 1, the numeral 10 generally designates a strainer coupling element which is adapted to be coupled into a fluid pressure line. The coupling element has an inlet passage at one end thereof which is formed through a threaded connection 12 and an outlet passage 13 which is formed through a threaded connection 14. The passages 11 and 13 within the coupling element are divided by partitions 15 and 16 which are formed to define a circular strainer screen seating surface 17.

An elongated, generally cylindrical strainer screen 18 is adapted to be held with its upper end positioned with the seating surface 17 by means of a housing 19. The strainer screen 18 is formed so that the lower portion thereof bears against the bottom of the housing 19. The upward movement of the screen 18 with respect to the coupling element 10 and the seating surface 17 is limited as by means of spaced projections 20 which extend inwardly from the wall of the coupling element defining the inlet passage.

The housing 19 is adapted to be coupled to an outwardly extending tubular projection 21 which is formed integrally with the coupling element and formed generally coaxially with the axis of the space within the circular seating surface 17, while extending outwardly from the main body portion of the coupling element. As will be readily seen in FIGURE 1, the housing 19 has an upper portion of uniform external diameter and a lower portion of tapered form. The upper portion of the housing at the inner end thereof is positioned rather snugly against the surrounding internal wall of the projection 21. The outer wall of the upper portion of the housing is provided with a groove 22. An O-ring is positioned in this groove for sealing contact with the internal wall of the projection 21 inwardly of cooperating coupling elements 24 and 25. The coupling elements 24 and 25 are formed on the housing 19 and projection 21 to allow a quick attachment and detachment.

As will be seen in FIGURE 2, the coupling elements 24 on the projection 21 take the form of spaced grooves 26 which are formed in the inner wall of the coupling element and which are formed on a diameter greater than the diameter of the remainder of the internal wall of the projection and greater than the diameter of the cover 19. It is convenient to form the projection 21 with diametrically spaced arm-like extensions of greater diameter than the remainder of the projection and with the grooves formed in these extensions as is seen in the drawings. The extensions each have a circumferential length of less than 90 degrees and are spaced apart by a circumferential distance of greater distance than 90 degrees.

The coupling element 25 on the housing 19 are in the form of spaced ribs which are adapted to be received within the grooves 26. The ribs extend outwardly from the housing. The ribs 25 are abuttable against the rim 21a of projection 21. The ribs preferably have a circumferential length such that they may be received easily within the space between the extensions carrying the grooves 26. Abutment legs 27a and 27b are carried at each end of each of the ribs 25 so that they project outwardly with respect to the remaining portions of the ribs. The longitudinal dimension of the ribs 25 between the abutment legs is less than the longitudinal dimension of the grooves 26 as is seen in FIGURES 5 and 6, while the overall longitudinal dimension of the ribs and abutment legs 27a is slightly less than the overall longitudinal dimension of the grooves 26. The longitudinal dimension of the legs 27b is greater than that of the grooves 26. This allows the ribs to be inserted in the grooves with sufficient space provided for easy rotation of the ribs and abutment legs 27a within the grooves. This also allows relative longitudinal movement of the ribs with respect to the grooves when the abutment legs may be spaced on opposite sides of and in abutting relation to the walls defining the grooves. When the strainer assembly is pressurized, the housing 19 may then move outwardly for a short extent to bring the abutment legs 27a into confronting relation to the ends of the extensions 24. The abutment legs then straddle the extensions and lock the strainer cover in position. The longer abutment legs 27b are positioned for abutment against the extensions whenever the ribs are positioned in the grooves. This provides a means of properly locating the ribs 25 and legs 27a for outward expansion of the housing.

It is preferable to form the interior of the housing 19 with angularly spaced supporting ribs 28 so as to provide some guiding and centering support for screen 18.

In use, the strainer housing is shifted outwardly by fluid pressure passing through the coupling 10 and screen 18 so that the ribs 25 abut against the outer wall surfaces of the grooves 26 as is seen in FIGURE 5. At this time, the abutment legs 27a and 27b straddle and overlap the extensions of projection 21 and prevent rotation of the screen housing relative to the coupling 10. At this time, O-ring 23 seals the housing and coupling fitting together to prevent loss of fluid. Fluid coupling element 10 is connected in a fluid line in a manner known to the art.

When it is desired to replace the strainer screen 18 or to clean strainer screen 18, the screen is easily removed as by pushing inwardly on housing 19 until the inner wall of the ribs 25 abuts the inner wall defining the groove 26. The housing 19 can then be rotated because the abutment legs 27a then are positioned for passage through the grooves. Rotation of approximately one quarter of a turn brings the ribs out of the groove 26 and the housing may then be pulled outwardly from the coupling fitting 10 for replacement and/or cleaning of the strainer screen 18.

To reassemble the housing with the coupling element 10, the reverse procedure is followed. The housing with the screen held centered by the ribs 28 is inserted within the projection 21 while the ribs 25 are positioned between the extensions which carry the grooves. The housing is moved inwardly until the upper surfaces of the ribs 25 are generally aligned with the upper surfaces of the grooves 26. The screen 18 is thus positioned within the seating surface 17 of the coupling fitting. The housing 19 is then rotated through approximately 80 degrees until the abutment legs 27b abut the ends of the extensions. The abutment legs 27a then are positioned outside of the grooves 26. The housing may then be pulled downwardly into the locked position or fluid pressure passing through the coupling fitting may force the housing 19 down into the locked position with the abutment legs 27a and 27b in abutting relation to the outer walls of the extensions. It should be noted that the use of the particular O-ring seal allows an adequate seal between the strainer housing and the coupling fitting but does not require critical axial locations of the mating parts of the seal.

Whereas I have shown and described an operative form of the invention, it should be understood that this showing and description thereof should be taken in an illustrative or diagrammatic sense only. There are modifications to the invention which will fall within the scope and spirit thereof and which will be apparent to those skilled in the art. The scope of the invention should be measured only by the scope of the hereinafter appended claims.

What is claimed is:

1. A strainer assembly including a strainer body having inlet and outlet passages therein and a connecting passage formed through a strainer seating surface, said body having a tubular portion in communication with said outlet passage while formed around and extending outwardly from said seating surface, an elongated tubular strainer housing having an open end removably coupled to said tubular portion, seal means between said housing and said tubular portion, said housing and tubular portion having cooperable, relatively rotatable coupling elements formed thereon, said coupling elements being formed and adapted to allow a limited amount of relative movement of said housing in directions outwardly and inwardly with respect to said seating surface, and between an inner position and an outer position, said housing being constructed to move to said outer position under the influence of pressure in said assembly, said coupling elements having means limiting the amount of outward movement of said housing relative to said tubular portion, said housing and tubular portion having cooperating abutment means engageable in the outer position of said housing induced by fluid pressure within said housing to restrict rotation of said coupling elements and prevent detachment of said housing from said tubular portion, said abutment means being constructed to be ineffective in the inner position of said housing.

2. The structure of claim 1 wherein said housing includes internal ribs projecting inwardly toward the central portion of said housing to provide a centering support for a filter screen carried by said housing.

3. The structure of claim 1 wherein said seal means includes a seal ring carried on the external wall of said housing and adapted for sliding engagement with an internal wall surface of said tubular portion at a position inwardly of said coupling elements.

4. The structure of claim 1 wherein said coupling elements include projecting and spaced ribs and spaced grooves, said ribs being receivable within said grooves and within spaces between said grooves through relative rotation thereof, said grooves having a dimension taken generally parallel to the longitudinal axis of said housing greater than the dimension of said ribs taken in the same direction, said abutment means being defined by spaced surfaces at the ends of said ribs and positioned outwardly of said ribs, said surfaces being circumferentially spaced to confront the outer ends of surfaces defining said grooves in the outer position of said housing to thereby lock the housing to said tubular portion.

5. The structure of claim 1 wherein said tubular portion includes spaced extensions with internal grooves formed therein, said housing has spaced ribs extending outwardly therefrom and receivable within said grooves, said ribs have annular lengths less than the length of spaces between said extensions but greater than the annular lengths of said extensions, said ribs have abutments at the ends thereof and extending longitudinally from said ribs, and said abutments are adapted for abutting engagement with the ends of said extensions, the combined dimension of an abutment and rib at the end of each rib taken longitudinally of said housing being slightly less than the longitudinal dimension of said grooves, said ribs having longitudinal dimensions between said abutments of lesser extent than said dimensions of said abutment and rib.

6. The structure of claim 5 wherein each rib has an abutment at the other end thereof with a longitudinal dimension greater than the longitudinal dimension of said grooves.

References Cited

UNITED STATES PATENTS

| 557,645 | 4/1896 | Blessing | 285—376 |
| 375,547 | 12/1887 | Gibbs | 285—376 X |
| 628,765 | 7/1899 | Collette | 285—376 X |
| 815,627 | 3/1906 | Oldham | 285—376 X |
| 2,147,026 | 3/1937 | Glab | 285—360 X |
| 2,283,974 | 5/1942 | Dillon | 285—360 X |
| 2,283,975 | 5/1942 | Dillon | 285—360 X |
| 2,647,768 | 8/1953 | Exton | 285—376 X |
| 2,966,990 | 1/1961 | Sicard | 210—443 |
| 3,397,135 | 8/1968 | Otto | 210—444 X |
| 3,116,942 | 1/1964 | Morello | 285—401 X |

REUBEN FRIEDMAN, Primary Examiner

T. A. GRANGER, Assistant Examiner